United States Patent
Mao et al.

(10) Patent No.: US 8,280,726 B2
(45) Date of Patent: Oct. 2, 2012

(54) GENDER DETECTION IN MOBILE PHONES

(75) Inventors: Yinian Mao, San Diego, CA (US); Gene Marsh, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 12/645,831

(22) Filed: Dec. 23, 2009

(65) Prior Publication Data

US 2011/0153317 A1    Jun. 23, 2011

(51) Int. Cl.
*G10L 11/04*    (2006.01)
*G10L 17/00*    (2006.01)

(52) U.S. Cl. .................. 704/207; 704/246; 704/270

(58) Field of Classification Search .............. 704/207, 704/208, 210, 246, 270
See application file for complete search history.

(56) References Cited

U.S. PATENT DOCUMENTS

| | | | | |
|---|---|---|---|---|
| 4,653,098 | A * | 3/1987 | Nakata et al. | 704/207 |
| 5,103,481 | A * | 4/1992 | Iseda et al. | 704/249 |
| 5,127,053 | A | 6/1992 | Koch | |
| 5,233,660 | A * | 8/1993 | Chen | 704/208 |
| 5,749,065 | A * | 5/1998 | Nishiguchi et al. | 704/200.1 |
| 5,950,155 | A * | 9/1999 | Nishiguchi | 704/230 |
| 6,366,108 | B2 * | 4/2002 | O'Neill et al. | 324/762.02 |
| 6,636,829 | B1 * | 10/2003 | Benyassine et al. | 704/201 |
| 7,232,948 | B2 * | 6/2007 | Zhang | 704/246 |
| 2003/0110038 | A1 * | 6/2003 | Sharma et al. | 704/270 |
| 2008/0234959 | A1 * | 9/2008 | Joublin et al. | 702/75 |

FOREIGN PATENT DOCUMENTS

GB    2400003 A    9/2004

OTHER PUBLICATIONS

Benyassine et al, "ITU-T Recommendation G.729 Annex B: a silence compression scheme for use with G.729 optimized for V.70 digital simultaneous voice and data applications," Communications Magazine, IEEE, vol. 35, No. 9, pp. 64-73, Sep. 1997.*
Abdulla et al. "Improving speechrecognition performance through gender separation", In Proc. of ANNES, pp. 1-6, Dunedin, NewZealand, 2001.*
Ting et al, "Combining MFCC and Pitch to Enhance the Performance of the Gender Recognition," Signal Processing, 2006 8th International Conference on, vol. 1, no., Nov. 2006, pp. 1-4.*
Gharavian and Ahadi. Statistical Evaluation of the Effect of Gender on Prosodic Parameters and their Influence on Gender-Dependent Speech Recognition. (2007) pp. 1-5.
3GPP2, High Rate Speech Service Option 17 for Wide Band Spread Spectrum Communication Systems, Miscellaneous (2004).

(Continued)

*Primary Examiner* — James Wozniak
(74) *Attorney, Agent, or Firm* — Jeffrey D. Jacobs

(57) ABSTRACT

An apparatus for wireless communications includes a processing system. The processing system is configured to receive an input sound stream of a user, split the input sound stream into a plurality of frames, classify each of the frames as one selected from the group consisting of a non-speech frame and a speech frame, determine a pitch of each of the frames in a subset of the speech frames, and identify a gender of the user from the determined pitch. To determine the pitch, the processing system is configured to filter the speech frames to compute an error signal, compute an autocorrelation of the error signal, find a maximum autocorrelation value, and set the pitch to an index of the maximum autocorrelation value.

36 Claims, 6 Drawing Sheets

OTHER PUBLICATIONS

Acero, Acoustical and environmental robustness in automatic speech recognition, Book (1993).
Ajmera, "Effect of age and gender on LP smoothed spectral envelope", Speaker and Language Recognition Workshop, 2006, IEEE Odyssey 2006: the (2006), pp. 1-4.
"Audio-based gender identification using bootstrapping", Communications, Computers and signal Processing, 2005, PACRIM. 2005 IEEE Pacific Rim Conference on (2005) pp. 432-433.
Bocklet et al., "Age and gender recognition for telephone applications based on GMM supervectors and support vector machines", Acoustics, Speech and Signal Processing, 2008, ICASSP 2008, IEEE International Conference ON (2008) pp. 1605-1608.
Carlin et al., "Detection of Speaker Change Points in Conversational Speech", Aerospace Conference, 2007 IEEE (2007) pp. 1-8.
Childers et al., "Automatic recognition of gender by voice", Acoustics, Speech, and Signal Processing, 1988, ICASSP-88., 1988 International Conference ON (1988) pp. 603-606 vol. 1.
Donglin Wang, et al., Enhanced Speech Recognition with Blind Equalization for Robot "WEVER-R2". Robot and Human interactive Communication, 2007. RO-MAN 2007. The 16th IEEE International Symposium on (2007) pp. 684-688.
Hye-Jin Kim, et al., Age and Gender Classification for a Home-Robot Service, Robot and Human interactive Communication, 2007. RO-MAN 2007. The 16th IEEE International Symposium on (2007) pp. 122-126.
International Search Report and Written Opinion—PCT/US2010/061165—ISA/EPO—Jun. 8, 2011.
Liao et al., "Algorithms for speech classification", Signal Processing and Its Applications, 1999, ISSPA '99, Proceedings of the Fifth International Symposium ON (1999) vol. 2 pp. 623-627, vol. 2.
Marks,"Real time speech classification and pitch detection", Communications and Signal Processing, 1988, Proceedings., COMSIG 88, Southern African Conference on (1988) pp. 1-6.
Marston, Gender adapted speech coding, Acoustics, Speech and Signal Processing, 1998, Proceedings of the 1998, IEEE International Conference on (1998) vol. 1 pp. 357-360 vol. 1.
Metze, et al., Comparison of Four Approaches to Age and Gender Recognition for Telephone Applications, Acoustics, Speech and Signal Processing, 2007, ICASSP 2007, IEEE International Conference on (2007) vol. 4 pp. IV-1089-IV-1092.
Parris et al., "Language independent gender identification", Acoustics, Speech, and Signal Processing, 1996, ICASSP-96, Conference Proceedings., 1996 IEEE International Conference on (1996) vol. 2 pp. 685-688 vol. 2.
Quatieri, Discrete-Time Speech Signal Processing: Principles and Practice, Book, Prentice Hall, (2002). Published Oct. 29, 2001, pp. 503-540, 711-724.
Rabiner, et al., A comparative performance study of several pitch detection algorithms, Acoustics, Speech and Signal Processing, IEEE Transactions on (1976) vol. 24 (5) pp. 399-418.
Rabiner L R: "On the use of autocorrelation analysis for pitch detection", IEEE Transactions on Acoustics and Signal Processing, IEEE Inc. New York, USA, vol. 25, No. 1, Feb. 1, 1977, pp. 24-33, XP002598141, ISSN: 0096-3518, DOI: DOI:10.1109/TASSP.1977.1162905.
Reynolds et al., "Robust text-independent speaker identification using Gaussian mixture speaker models", Speech and Audio Processing, IEEE Transactions on (1995) vol. 3 (1) pp. 72-83.
Ting, et al., Combining MFCC and Pitch to Enhance the Performance of the Gender Recognition, Signal Processing, 2006 8th International Conference on (2006) vol. 1 pp. 1-4.
Un C K et al: "A Pitch Extraction Algorithm Based on LPC Inverse Filtering and AMDF", IEEE Transactions on Acoustics, Speech and Signal Processing, IEEE Inc. New York, USA, vol. ASSP-25, No. 6, Dec. 1, 1977, pp. 565-572, XP002062146, ISSN: 0096-3518.
Xiaofan Lin and Simske, Phoneme-less hierarchical accent classification, Signals, Systems and Computers, 2004, Conference Record of the Thirty-Eighth Asilomar Conference on (2004) vol. 2 pp. 1801-1804 vol. 2.
Xiaofan Lin, Decision combination in speech metadata extraction, Signals, Systems and Computers, 2003, Conference Record of the Thirty-Seventh Asilomar Conference on (2003) vol. 1 pp. 560-564 vol. 1.
Yen-Liang Shue and Iseli, The role of voice source measures on automatic gender classification, Acoustics, Speech and Signal Processing, 2008, ICASSP 2008, IEEE International Conference on (2008) pp. 4493-4496.
Yingle, Fan et al: "Speaker gender identification based on combining linear and nonlinear features", Intelligent Control and Automation, 2008. WCICA 2008. 7TH World Congress on, IEEE, Piscataway, NJ, USA, Jun. 25, 2008, pp. 6745-6749, XP031301918, ISBN: 978-1-4244-2113-8.
Yu-Min Zeng, et al., Robust GMM Based Gender Classification using Pitch and RASTA-PLP Parameters of Speech, Machine Learning and Cybernetics, 2006 International Conference on (2006) pp. 3376-3379.

* cited by examiner

GENDER DETECTION IN MOBILE PHONES

BACKGROUND

1. Field

The following description relates generally to gender detection and, more particularly, to gender detection in mobile phones.

2. Background

A target market is the market segment to which a particular product is marketed. The market segment is often defined by age, socio-economic grouping, or by gender. In order to provide targeted marketing on mobile phones to a gender defined market segment without specifically asking for information, a gender detection algorithm may be used to determine gender from voice input to the mobile phones. Existing gender detection algorithms are not sufficiently accurate. As such, there is a need for an improved gender detection algorithm for use in mobile phones.

SUMMARY

In an aspect of the disclosure, an apparatus for wireless communications includes a processing system. The processing system is configured to receive an input sound stream of a user, split the input sound stream into a plurality of frames, classify each of the frames as one selected from the group consisting of a non-speech frame and a speech frame, determine a pitch of each of the frames in a subset of the speech frames, and identify a gender of the user from the determined pitch. To determine the pitch, the processing system is configured to filter the speech frames to compute an error signal, compute an autocorrelation of the error signal, find a maximum autocorrelation value, and set the pitch to an index of the maximum autocorrelation value.

In another aspect of the disclosure, a method for wireless communications includes receiving an input sound stream of a user, splitting the input sound stream into a plurality of frames, classifying each of the frames as one selected from the group consisting of a non-speech frame and a speech frame, determining a pitch of each of the frames in a subset of the speech frames, and identifying a gender of the user from the determined pitch. Determining the pitch includes filtering the speech frames to compute an error signal, computing an autocorrelation of the error signal, finding a maximum autocorrelation value, and setting the pitch to an index of the maximum autocorrelation value.

In another aspect of the disclosure, an apparatus for wireless communications includes means for receiving an input sound stream of a user, means for splitting the input sound stream into a plurality of frames, means for classifying each of the frames as one selected from the group consisting of a non-speech frame and a speech frame, means for determining a pitch of each of the frames in a subset of the speech frames, and means for identifying a gender of the user from the determined pitch. The means for determining the pitch includes means for filtering the speech frames to compute an error signal, means for computing an autocorrelation of the error signal, means for finding a maximum autocorrelation value, and means for setting the pitch to an index of the maximum autocorrelation value.

In another aspect of the disclosure, a computer program product includes a computer-readable medium. The computer-readable medium includes code for receiving an input sound stream of a user, code for splitting the input sound stream into a plurality of frames, code for classifying each of the frames as one selected from the group consisting of a non-speech frame and a speech frame, code for determining a pitch of each of the frames in a subset of the speech frames, and code for identifying a gender of the user from the determined pitch. The code for determining the pitch includes code for filtering the speech frames to compute an error signal, code for computing an autocorrelation of the error signal, code for finding a maximum autocorrelation value, and code for setting the pitch to an index of the maximum autocorrelation value.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Examples of apparatuses suitable for incorporating various aspects of the invention include, but are not limited to, a mobile phone capable of operating in a wireless network. A mobile phone may be referred to as a user terminal, a mobile station, a mobile device, a subscriber station, a wireless device, a terminal, an access terminal, a node, or some other suitable terminology. The various concepts described throughout this disclosure are intended to apply to all suitable apparatuses regardless of their specific nomenclature.

Figure 1:
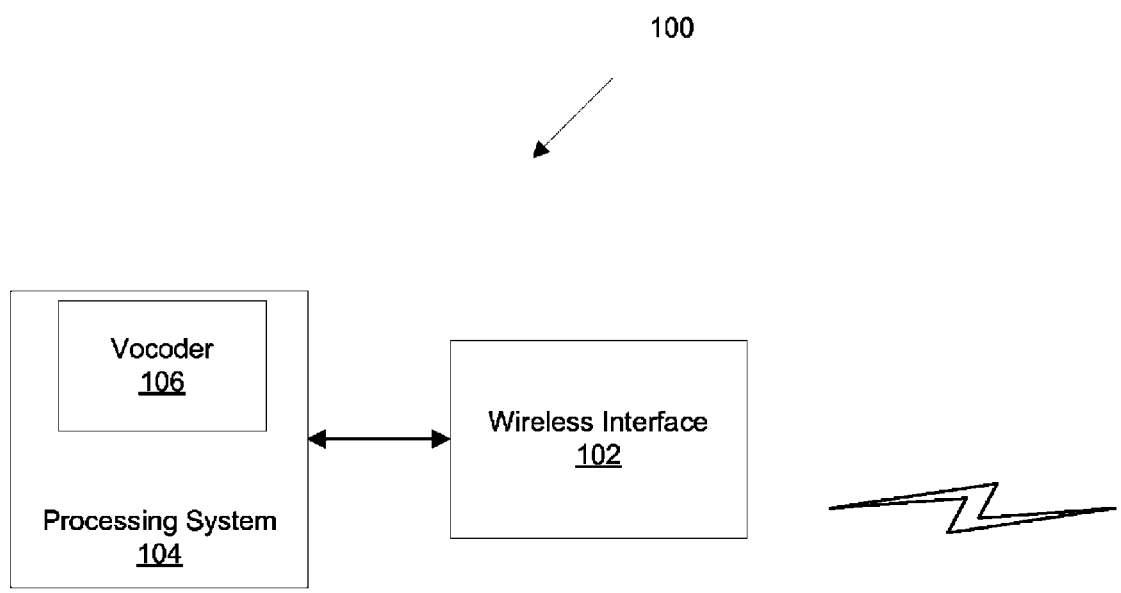
FIG. 1 is a conceptual block diagram illustrating a hardware configuration for an exemplary apparatus.

Various aspects of an apparatus will now be presented with reference to FIG. 1. FIG. 1 is a conceptual block diagram illustrating a hardware configuration for an apparatus. The apparatus 100 may include a wireless interface 102, a processing system 104, and a vocoder 106.

The wireless interface 102 may include a transceiver having a transmitter and receiver function to support two-way communications over the wireless medium. Alternatively, the wireless interface 102 may be configured as a transmitter or receiver to support one-way communications.

The wireless interface 102 is shown as a separate entity. However, as those skilled in the art will readily appreciate, the wireless interface 102, or any portion thereof, may be integrated into the processing system 104, or distributed across multiple entities within the apparatus 100.

The processing system 104 includes a vocoder 106. The vocoder 106 provides a signed 16-bit integer data stream that is monophonic and sampled at a data rate of 8 kHz. The vocoder 106 assumes that at least 14 of the 16 bits are utilized. The processing system 104 may include one or more processors. The one or more processors may be implemented with any combination of general-purpose microprocessors, microcontrollers, a Digital Signal Processors (DSP), Field Programmable Gate Arrays (FPGA), Programmable Logic Devices (PLD), controllers, state machines, gated logic, discrete hardware components, or any other suitable entities that can perform calculations or other manipulations of information.

The processing system 104 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 102 to perform the various functions described below, as well as other protocol processing functions.

Machine-readable media may include storage integrated into one or more of the processors. Machine-readable media may also include storage external to the one or more processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system.

Figure 2:
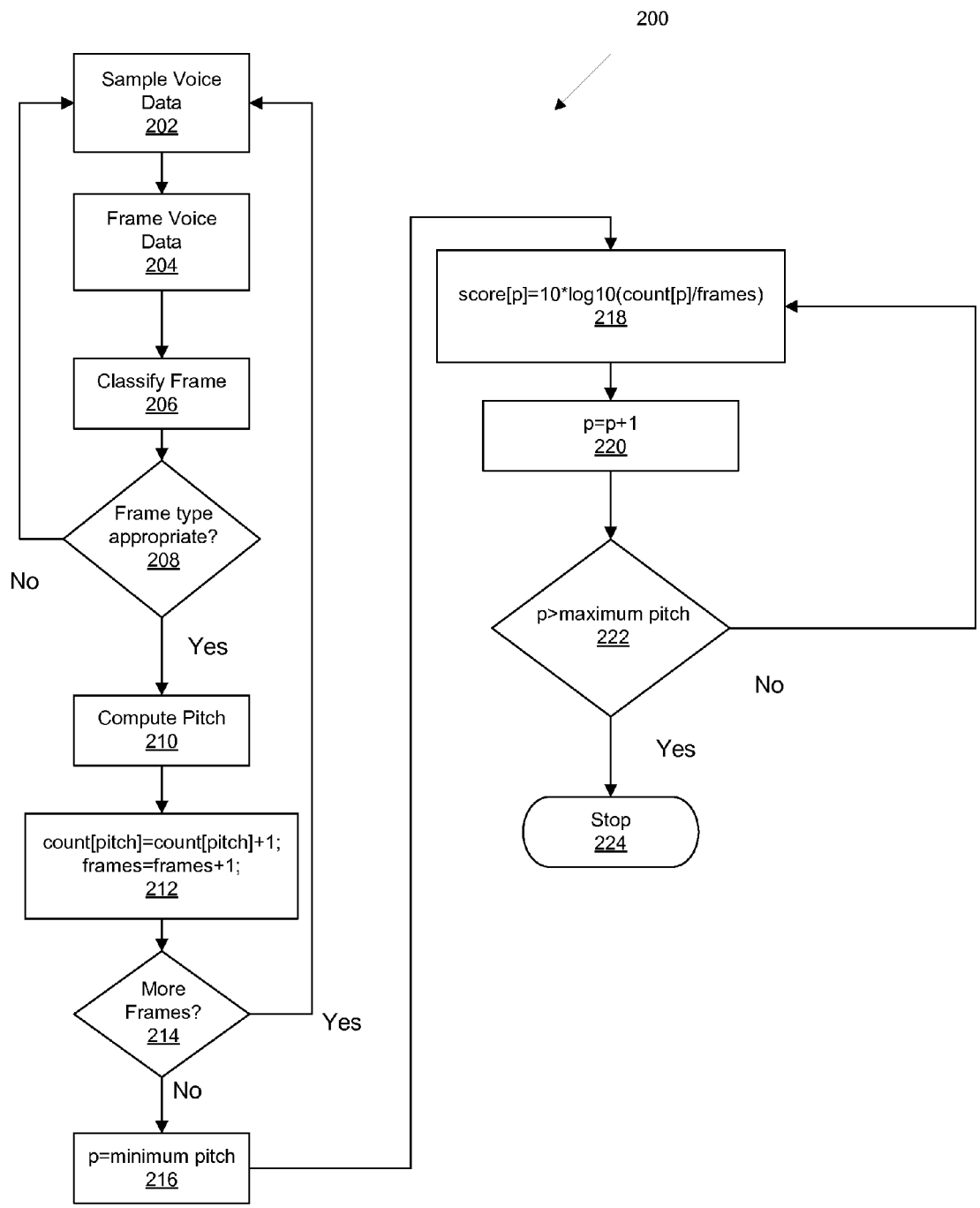
FIG. 2 is a flow chart for training to produce scores related to pitch for known genders.

FIG. 2 is a flow chart 200 for training to produce scores related to pitch for known genders. As shown in FIG. 2, the voice data is sampled (step 202) by the vocoder 106 at a data rate of 8 kHz to provide a signed 16-bit integer data stream that is monophonic. The sampled voice data is passed through a high-pass filter to remove the DC component. In one configuration, a high pass filter with the following transfer function is used:

$$H(z) = 0.94615 \frac{z^2 - 2z + 1}{z^2 - 1.88z + 0.8836}.$$

After the sampled voice data is passed through a high-pass filter, the filtered data is assembled into frames (step 204). In one configuration, each frame is 20 ms and includes 160 voice samples. The frames may be overlapping or non-overlapping. In one configuration, each frame overlaps 80 samples of a previous frame. Each frame is then passed through a Hamming window defined by $$w_n = 0.53836 + 0.46164 \cos\left(2\pi \frac{n-80}{159}\right).$$

Figure 4:
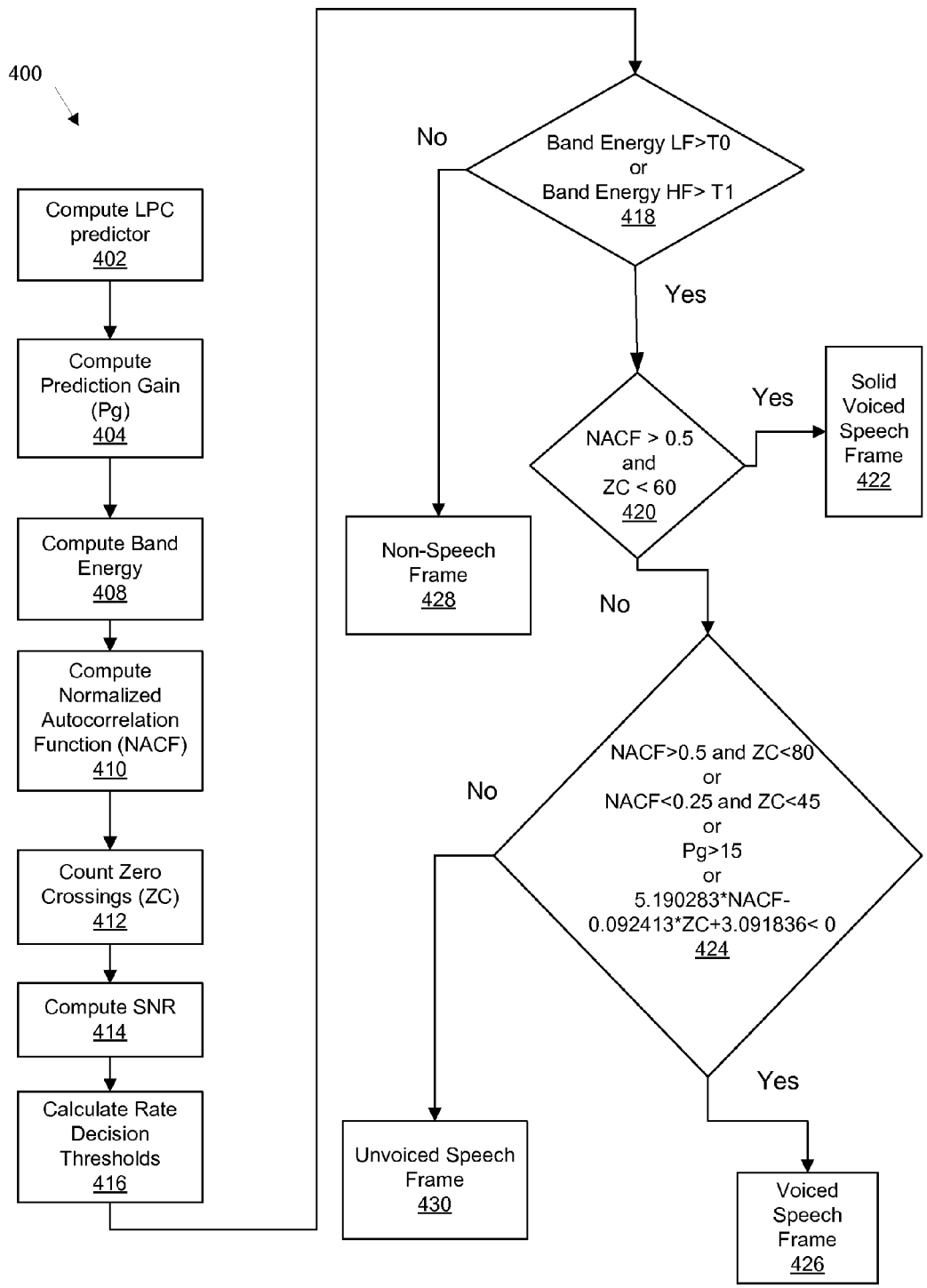
FIG. 4 is a flow chart for classifying a frame as solid voiced, voiced, and unvoiced.

Next, each frame is classified as a speech frame or a non-speech frame (i.e., a frame without speech), and if the frame is a speech frame, the frame is classified as solid voice, voiced, or unvoiced (step 206). Voiced speech is defined as the pronunciation of sounds when the larynx vibrates and unvoiced speech is defined as the pronunciation of sounds when the larynx does not vibrate. Solid voiced speech is speech that is clearly voiced. FIG. 4, to be discussed infra, provides one example of how to classify a frame as a non-speech frame, a solid voiced speech frame, a voiced speech frame, or an unvoiced speech frame. That is, the flow chart 400 of FIG. 4 is an expansion of the step 206 of FIG. 2.

In step 208, the frame is determined as being appropriate for analysis. In one configuration, all speech frames are analyzed. In another configuration, only voiced and solid voiced speech frames are analyzed. In yet another configuration, only solid voiced speech frames are analyzed. In step 210, the pitch is computed for the frames provided from step 208. The pitch may be represented as an integer between 10 and 59, inclusive. A count is maintained for each pitch detected (step 212). In addition, a count is maintained of the total number of frames (step 212). This process proceeds (step 214) until there is no more sample voice data. A score for each pitch (steps 216-222) is a function of the count for each pitch divided by the number of frames (i.e., score[p]=f(count[p]/frames)) and may be calculated as follows:

score[p]=10*log 10(count[p]/frames).

The training to produce scores related to pitch for known genders stops (step 224) after scores are determined for the provided known male and known female sample voice data. Separate scores are determined for known male and known female sample voice data, as the steps in the flow chart 200 are performed independently for known male and known female sample voice data.

Figure 3:
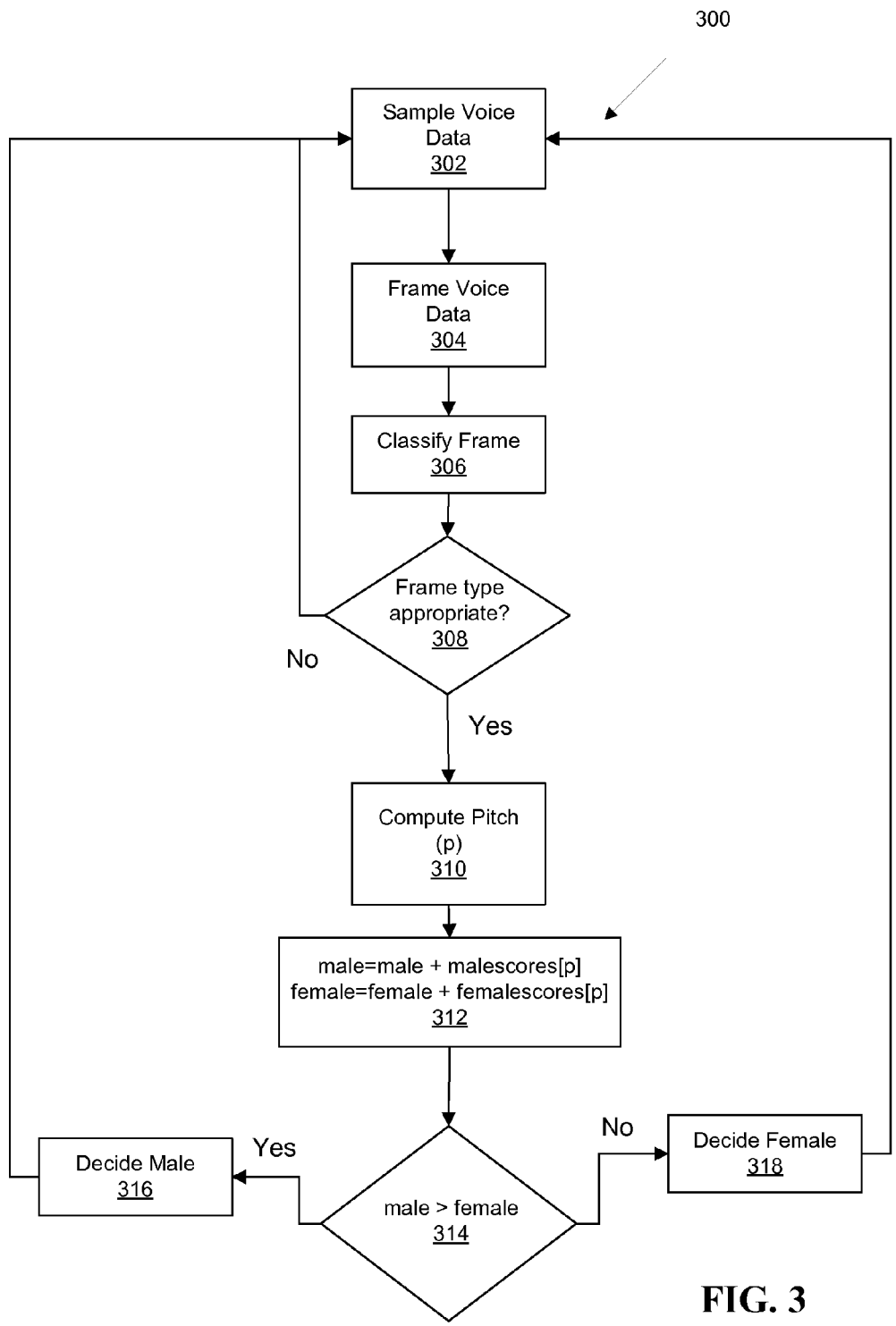
FIG. 3 is a flow chart for determining gender of a speaker.

FIG. 3 is a flow chart 300 for determining gender of a speaker. The voice data is sampled (step 302); split into frames (step 304); classified as a non-speech frame, an unvoiced speech frame, a voiced speech frame, or a solid voiced speech frame (step 306); and the pitch is determined (step 310) for the frames deemed appropriate (step 308). The steps 302-308 proceed similarly to steps 202-210 of FIG. 2 as described supra. As such, in step 308, in one configuration, all speech frames are deemed appropriate for analysis. In another configuration, only voiced speech frames and solid voiced speech frames are deemed appropriate for analysis. In yet another configuration, only solid voiced speech frames are deemed appropriate for analysis. After the pitch is determined in step 310, the male and female scores for the determined pitch are added to a running sum of the male scores and a running sum of the female scores, respectively (step 312). If the male count is greater than the female count (step 314), the voice data is classified as male (step 316), otherwise the voice data is classified as female (step 318).

FIG. 4 is a flow chart 400 for classifying a frame as a non-speech frame, an unvoiced speech frame, a voiced speech frame, and a solid voiced speech frame. The flow chart 400 is an expansion of step 206 of FIG. 2 and of step 306 of FIG. 3. To classify the frame, a Linear Predictive Coding (LPC) module receives the frame data and computes the LPC predictor for the frame (step 402). The first step in computing the LPC predictor is to compute the autocorrelation function of the frame for lags (i.e., shifts) 0 through 16. If a preprocessed frame number n is identified as having samples $s_k$, $0 \leq k < 160$, then $$R_k\{n\} = \sum_{0 \leq m < 160-k} s_k\{n\} s_{m+k}\{n\}, 0 \leq k < 17.$$

Given the autocorrelation function, LPC coefficients are computed using a Levinson-Durbin recursion. Assuming $E^i$ for $0 \leq i < 11$ is the error energy in the linear predictor of order i, and $a_j^i$ for $0 \leq j < i < 11$ is the coefficient j of the order i predictor, these values are calculated recursively, starting with $a_0^0 = 0$ and $E^0 = R_0$. With $1 \leq i < 11$, a weighting factor is calculated for the order i predictor:

$$k_i\{n\} = \frac{R_i\{n\} - \sum_{1 \leq j < i-1} \alpha_j^{i-1}\{n\} r_{i-j}\{n\}}{E^{i-1}\{n\}}.$$

The error energy and the coefficients for order i are then updated as follows:

$$\alpha_i^i\{n\} = k_i\{n\}$$

$$\alpha_j^i\{n\} = \alpha_j^{i-1} = \{n\} - k_i\{n\} \alpha_{i-j}^{i-1}\{n\}$$

$$E^i\{n\} = (1 - k_i\{n\}^2) E^{i-1}\{n\}$$

The LPC order i predictor is $$a(z)\{n\} = \sum_{0 \leq j < 11} a_j\{n\} z^{-j},$$

where $\alpha_j\{n\} = \alpha_j^{10}\{n\}$. The prediction error filter transfer function is given by $$A(z)\{n\} = 1 - \sum_{0 \leq j < 11} a_j\{n\} z^{-j}.$$

After the LPC predictor is calculated in step 402, the prediction gain $Pg\{n\}$ is computed (step 404). The prediction gain $Pg\{n\}$ is calculated using the frame autocorrelation function and the LPC predictor:

$$Pg\{n\} = \frac{R_0\{n\}}{R_0\{n\} - \sum_{0 \leq i < 11} a_i\{n\} R_i\{n\}}.$$

After the prediction gain is determined, the band energy is computed (step 408). The speech signal is divided into a low frequency band and a high frequency band by a pair of filters. In the following description, the low frequency band is represented by index 0 and the high frequency band is represented by index 1. Metrics that are computed include the band identification as a superscript.

In step 408, the energy contained in each band is computed. The band energy may be computed by using a filtered version of the autocorrelation function. Table 1 shows the coefficients for the low pass and the high pass filters.

TABLE 1

Table of Filters

| Index | Low Freq. Band | High Freq. Band |
|---|---|---|
| 0 | −5.557699E−02 | −1.229538E−02 |
| 1 | −7.216371E−02 | 4.376551E−02 |
| 2 | −1.036934E−02 | 1.238467E−02 |
| 3 | 2.344730E−02 | −6.243877E−02 |
| 4 | −6.071820E−02 | −1.244865E−02 |
| 5 | −1.398958E−01 | 1.053678E−01 |
| 6 | −1.225667E−02 | 1.248720E−02 |
| 7 | 2.799153E−01 | −3.180645E−01 |
| 8 | 4.375000E−01 | 4.875000E−01 |
| 9 | 2.799153E−01 | −3.180645E−01 |
| 10 | −1.225667E−02 | 1.248720E−02 |
| 11 | −1.398958E−01 | 1.053678E−01 |
| 12 | −6.071820E−02 | −1.244865E−02 |
| 13 | 2.344730E−02 | −6.243877E−02 |
| 14 | −1.036934E−02 | 1.238467E−02 |
| 15 | −7.216371E−02 | 4.376551E−02 |
| 16 | −5.557699E−02 | −1.229538E−02 |

To compute the band energies $BE^i\{n\}$ for frame n, the appropriate filters for the autocorrelation is computed, $Rf^i$ for i equal to 0 and 1, and then the band energies $BE^i$ are computed:

$$Rf_k^i = \sum_{0 \leq m < 17-k} h_m^i h_{m+k}^i$$

$$BE^i\{n\} = R_0\{n\} Rf_0^i + 2.0 \sum_{1 \leq m < 17} R_m\{n\} Rf_m^i$$

The smoothed band energy $Esm^i$ may also be computed:

$$Esm^i\{n\} = 0.6 Esm^i\{n-1\} + 0.4 BE^i\{n\}$$

with $Esm^0$ initialized to 3200000 and $Esm^1$ initialized to 320000.

In step 410, the normalized autocorrelation function (NACF) is computed. The normalized autocorrelation function is based on the peak of the autocorrelation function of the error signal. The NACF is computed in several steps:
(1) Compute the error signal, i.e., filter the original frame data by $A(z)\{n\}$ to produce $e_k\{n\}$.
(2) Low pass filter the error signal using the filter shown in Table 2:

TABLE 2

Low pass filter for decimating the error signal.

| Index | Coefficient |
|---|---|
| 0 | 2.725341e−03 |
| 1 | 1.028254e−02 |
| 2 | 5.973260e−03 |
| 3 | −2.308975e−02 |
| 4 | −5.009796e−02 |
| 5 | −1.323563e−02 |
| 6 | 1.166278e−01 |
| 7 | 2.767512e−01 |
| 8 | 3.500000e−01 |
| 9 | 2.767512e−01 |
| 10 | 1.166278e−01 |
| 11 | −1.323563e−02 |
| 12 | −5.009796e−02 |
| 13 | −2.308975e−02 |
| 14 | 5.973260e−03 |
| 15 | 1.028254e−02 |
| 16 | 2.725341e−03 |

(3) Decimate the error waveform by a factor of 2 to produce $ed_k\{n\}$, i.e., $ed_k\{n\}=e_{2k}\{n\}$ for $0 \leq k < 80$.

(4) Compute the autocorrelation of the decimated error $$Red_m\{n\} = \sum_{0 \leq k < 80} ed_k\{n\}ed_{k-m}\{n\},$$

for $10 \leq m < 60$. Note that in this formula, k-m may be negative. There are various ways to deal with this, including assuming all such values are zero, using samples from the previous frame (i.e., $ed_{k-m}\{n\} = ed_{80-k+m}\{n-1\}$), or adjusting the bottom index of the sum to start at 59.

(5) Let $p\{n\}$=arg max $Red_m\{n\}$, for $10 \leq m < 60$, where $p\{n\}$ is designated as the pitch of the voice sample.

(6) Compute the normalized autocorrelation as $$NACF\{n\} = \frac{\sum_{0 \leq k < 80} ed_k\{n\}ed_{k-p}\{n\}}{0.5 \sum_{0 \leq k < 80} (ed_k\{n\}ed_k\{n\} + ed_{k-p}\{n\}ed_{k-p}\{n\})}.$$

(7) If NACF is 0, then reset NACF to 1,000,000.

In step 412, the zero crossings ($ZC\{n\}$) are counted. To calculate the zero crossings, the mean of the samples within a frame is calculated and the calculated mean is subtracted from the frame samples. Any time two adjacent frame samples have different signs, a count of the zero crossings in incremented. As such, crossings are determined each time the signal in the samples crosses the mean.

In step 414, the signal to noise ratio ($SNR\{n\}$) is computed. To compute $SNR\{n\}$, a signal estimate and a background noise estimate are calculated. If the $NACF\{n\}$ is greater than 0.5 for 5 consecutive frames, the signal estimate $S^i\{n\}=\max\{0.97S^i\{n-1\}, Esm^i\{n\}\}$ for as long as NACF is greater than 0.5. Otherwise, $S^i\{n\}=\max\{S^i\{n-1\}, Esm^i\{n\}\}$. The background noise estimate $B^i$ is determined by one of two algorithms chosen depending on the value of NACF. If NACF is less than 0.38 for more than 8 consecutive frames, then $B^i\{n\}=\min\{Esm^i\{n\}, \max\{1.03B^i\{n-1\}, B^i\{n-1\}+1\}\}$. Otherwise, if SNR>3, then $B^i\{n\}=\min\{Esm^i\{n\}, \max\{1.00547B^i\{n-1\}, B^i\{n-1\}+1\}\}$, and if SNR$\leq$3, then $B^i\{n\}=\min\{Esm^i\{n\}, B^i\{n-1\}\}$. After determining the background noise estimate, $B^0\{n\}$ is limited to be between 10 and 5059644 and $B^1\{n\}$ is limited to be between 5 and 5059644.

To compute $SNR\{n\}$, $QSNRU^i\{n\}$ is calculated as $$QSNRU^i\{n\} = \frac{10\log_{10}\left(\frac{S^i\{n\}}{B^i\{n\}}\right) - 20}{5}.$$

$QSNRU^i\{n\}$ is rounded to the nearest integer with a hard limit at 0 and 7 to obtain $SNR^i\{n\}$.

In step 416, rate decision thresholds are calculated. The thresholds used for the rate decisions are based on the SNR of the previous frame. The threshold for the lower band is $T^0\{n\}$ and the threshold for the upper band is $T^1\{n\}$. The thresholds $T^0\{n\}$ and $T^1\{n\}$ are determined as follows:

(1) Use the SNR from the previous frame ($SNR^i\{n-1\}$) to index into the Table 3 to obtain $t_i\{n\}$.

TABLE 3

Lookup Table for Thresholds

| SNR | $t_0$ | $t_1$ |
|---|---|---|
| 0 | 7 | 9 |
| 1 | 7 | 12.6 |
| 2 | 8 | 17 |
| 3 | 8.6 | 18.5 |
| 4 | 8.9 | 19.4 |
| 5 | 9.4 | 20.9 |
| 6 | 11.0 | 25.5 |
| 7 | 15.8 | 39.8 |

(2) Compute $T^i\{n\}=t_i\{n\}B\{n-1\}$.

In step 418, if $BE^0\{n\}>T^0\{n\}$ or $BE^1\{n\}>T^1\{n\}$, the process moves to step 420, otherwise the frame is determined to be a non-speech frame (step 428). In step 420, if $NACF\{n\}>0.5$ and $ZC\{n\}<60$, then the frame is determined to be a solid voiced speech frame (step 422). Otherwise, if $NACF\{n\}>0.5$ and $ZC\{n\}<80$ or $NACF\{n\}<0.25$ and $ZC\{n\}<45$ or $Pg\{n\}>15$ or $5.190283*NACF\{n\}-0.092413*ZC\{n\}+3.091836<0$ (step 424), then the frame is determined to be a voiced speech frame (step 426). Otherwise, the frame is determined to be an unvoiced speech frame (step 438).

Figure 5:
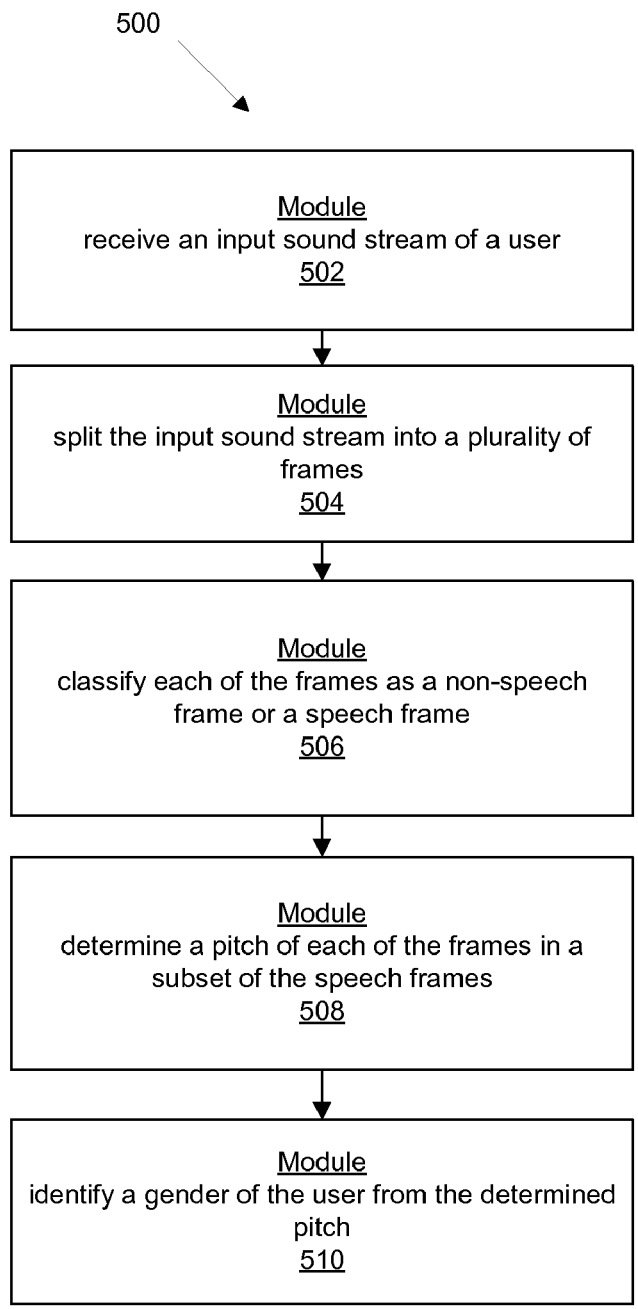
FIG. 5 is a modular diagram of an exemplary apparatus.

FIG. 5 is a modular diagram 500 of an exemplary apparatus 104. The exemplary apparatus 104 includes a module 502 to receive an input sound stream of a user. The exemplary apparatus 104 further includes a module 504 to split the input sound stream into a plurality of frames. A frame may be referred to as a packet, a slot, a time slot, or otherwise, some data defined by a time period. The exemplary apparatus 104 further includes a module 506 to classify each of the frames as a non-speech frame or a speech frame, a module 508 to determine a pitch of each of the frames in a subset of the speech frames, and a module 510 to identify the gender of the user from the determined pitch. The subset of the speech frames may include only solid voiced speech frames. Alternatively, the subset of the speech frames includes both solid voiced speech frames and voiced speech frames. In another configuration, the subset of the speech frames includes all speech frames, and therefore further includes unvoiced speech frames.

Figure 6:
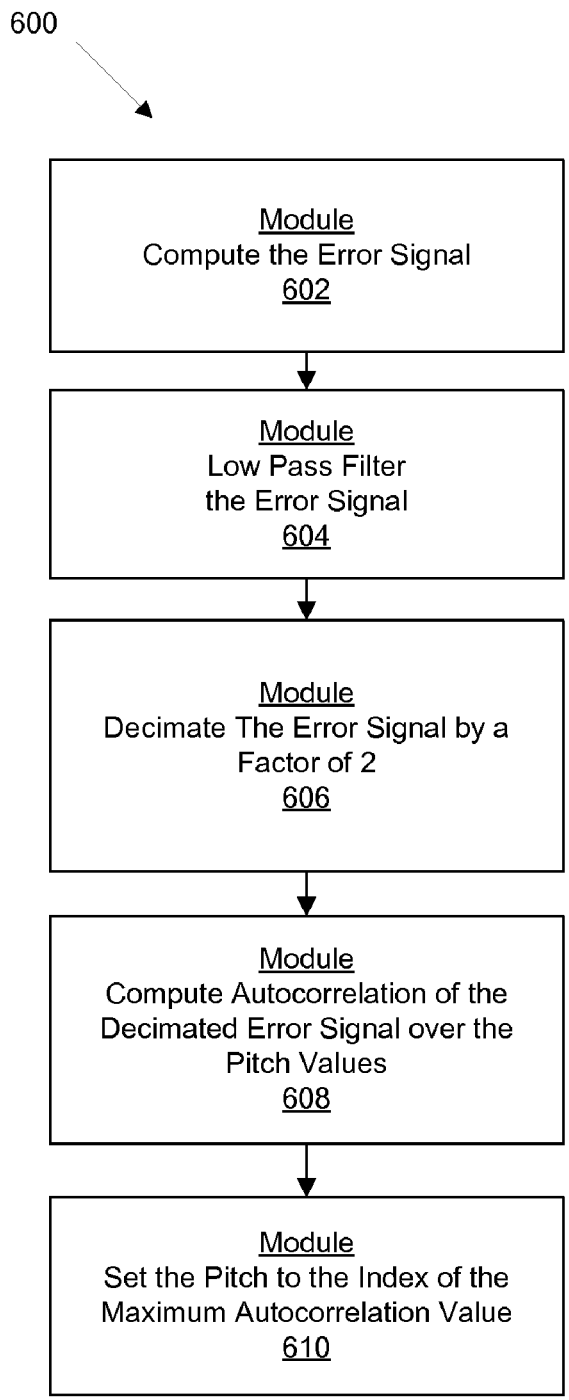
FIG. 6 is a modular diagram for computing a pitch of a signal in an exemplary apparatus.

FIG. 6 is a modular diagram 600 for computing a pitch of a signal in an exemplary apparatus 104. The modular diagram 600 expands module 508 of FIG. 5. As shown in FIG. 6, the pitch is computed with five modules that follow the first five steps defined for determining the NACF. In module 602, an error signal is computed by filtering the original frame data by $A(z)\{n\}$ to produce $e_k\{n\}$. In module 604, the error signal is low pass filtered using the filter with the filter coefficients defined in Table 2. In module 606, the error signal is decimated by a factor of 2 to produce $ed_k\{n\}$, i.e., $ed_k\{n\}=e_{2k}\{n\}$ for $0 \leq k < 80$. In module 608, the autocorrelation is computed of the decimated error signal over the pitch values to obtain $$Red_m\{n\} = \sum_{0 \leq k < 80} ed_k\{n\}ed_{k-m}\{n\},$$

for $10 \leq m < 60$. The pitch p is defined as $p\{n\}$=arg max $Red_m\{n\}$ for $10 \leq m \leq 59$. As such, if the maximum of $Red_m\{n\}$ for $10 \leq m \leq 59$ is $Red_M\{n\}$, then $p\{n\}=M$.

In one configuration, an apparatus for wireless communications includes means for receiving an input sound stream of a user, means for splitting the input sound stream into a plurality of frames, means for classifying each of the frames as one selected from the group consisting of a non-speech frame and a speech frame, means for determining a pitch of each of the frames in a subset of the speech frames, and means for identifying a gender of the user from the determined pitch. The means for determining the pitch includes means for filtering the speech frames to compute an error signal, means for filtering the error signal with a low pass filter, means for decimating the filtered error signal, means for computing an autocorrelation of the decimated error signal, means for finding a maximum autocorrelation value, and means for setting the pitch to an index of the maximum autocorrelation value. The aforementioned means is the processing system 104 configured to perform the function identified in each of the aforementioned means.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. An apparatus for wireless communications, comprising: a processing system configured to:
   receive an input sound stream of a user;
   split the input sound stream into a plurality of frames;
   classify each of the frames as one selected from the group consisting of a non-speech frame and a speech frame;
   determine a pitch of each of the frames in a subset of the speech frames;
   maintain a table comprising a male score for each pitch and a female score for each pitch; the male scores being determined by computing a pitch of each of a number of male frames, counting a number of the frames with each particular pitch, and setting the male score for each pitch to a function of the number of the frames with the pitch divided by the number of male frames; the female scores being determined by computing a pitch of each of a number of female frames, counting a number of the frames with each particular pitch, and setting the female score for each pitch to a function of the number of the frames with the pitch divided by the number of female frames;
   maintain a first sum including the male score for each determined pitch of each of the frames;
   maintain a second sum including the female score for each determined pitch of each of the frames; and
   identify a gender of the user as male when the first sum is greater than the second sum and identify the gender as female when the second sum is greater than the first sum,
   wherein to determine the pitch, the processing system is configured to:
      filter the speech frames to compute an error signal;
      compute an autocorrelation of the error signal;
      find a maximum autocorrelation value; and
      set the pitch to an index of the maximum autocorrelation value.

2. The apparatus of claim 1, wherein to determine the pitch, the processing system is further configured to filter the error signal with a low pass filter and to decimate the filtered error signal before computing the autocorrelation of the error signal.

3. The apparatus of claim 1, wherein the subset of the speech frames comprises solid voiced speech frames.

4. The apparatus of claim 3, wherein the subset of the speech frames further comprises voiced speech frames.

5. The apparatus of claim 4, wherein the subset of the speech frames further comprises unvoiced speech frames.

6. The apparatus of claim 1, wherein the male score and the female score for each pitch are predetermined.

7. The apparatus of claim 1, wherein to classify each of the frames, the processing system is configured to:
   compute a Linear Predictive Coding (LPC) predictor of the frame by determining an autocorrelation function of the frame and determining LPC coefficients;
   compute a prediction gain (Pg) using the autocorrelation function and the LPC predictor;
   compute a low frequency band energy (LFBE) and a high frequency band energy (HFBE) using the autocorrelation function;
   compute a normalized autocorrelation function (NACF) of an error signal;
   count zero crossings (ZC) of samples of each of the frame;
   compute a low frequency signal to noise ratio by using the NACF and the low frequency band energy;
   compute a high frequency signal to noise ratio by using the NACF and the high frequency band energy;
   calculate a low frequency rate decision threshold (T0) by using the low frequency signal to noise ratio; and
   calculate a high frequency rate decision threshold (T1) by using the high frequency signal to noise ratio.

8. The apparatus of claim 7, wherein the processing system is configured to classify each of the frames as follows:
   if LFBE>T0 or HFBE>T1, then the frame is a speech frame, otherwise the frame is a non-speech frame;
   if the frame is a speech frame and NACF>0.5 and ZC<60, then the frame is a solid voiced speech frame, otherwise the frame is an unvoiced speech frame or a voiced speech frame;
   if the frame is an unvoiced speech frame or a voiced speech frame and
   NACF>0.5 and ZC<80
      Or
   NACF<0.25 and ZC<45
      Or
   Pg>15
      Or
   $5.190283*NACF-0.092413*ZC+3.091836<0$,
   then the frame is a voiced speech frame, otherwise the frame is an unvoiced speech frame.

9. A method for wireless communications, comprising:
   receiving an input sound stream of a user;

splitting the input sound stream into a plurality of frames;
classifying each of the frames as one selected from the group consisting of a non-speech frame and a speech frame;
determining a pitch of each of the frames in a subset of the speech frames;
maintaining a table comprising a male score for each pitch and a female score for each pitch; the male scores being determined by computing a pitch of each of a number of male frames, counting a number of the frames with each particular pitch, and setting the male score for each pitch to a function of the number of the frames with the pitch divided by the number of male frames; the female scores being determined by computing a pitch of each of a number of female frames, counting a number of the frames with each particular pitch, and setting the female score for each pitch to a function of the number of the frames with the pitch divided by the number of female frames;
maintaining a first sum including the male score for each determined pitch of each of the frames;
maintaining a second sum including the female score for each determined pitch of each of the frames; and
identifying a gender of the user as male when the first sum is greater than the second sum and identifying the gender as female when the second sum is greater than the first sum,
wherein determining the pitch comprises:
    filtering the speech frames to compute an error signal;
    computing an autocorrelation of the error signal;
    finding a maximum autocorrelation value; and
    setting the pitch to an index of the maximum autocorrelation value.

10. The method of claim 9, wherein determining the pitch further comprises filtering the error signal with a low pass filter and decimating the filtered error signal before computing the autocorrelation of the error signal.

11. The method of claim 9, wherein the subset of the speech frames comprises solid voiced speech frames.

12. The method of claim 11, wherein the subset of the speech frames further comprises voiced speech frames.

13. The method of claim 12, wherein the subset of the speech frames further comprises unvoiced speech frames.

14. The method of claim 9, wherein the male score and the female score for each pitch are predetermined.

15. The method of claim 9, wherein classifying each of the frames comprises:
    computing a Linear Predictive Coding (LPC) predictor of the frame by determining an autocorrelation function of the frame and determining LPC coefficients;
    computing a prediction gain (Pg) using the autocorrelation function and the LPC predictor;
    computing a low frequency band energy (LFBE) and a high frequency band energy (HFBE) using the autocorrelation function;
    computing a normalized autocorrelation function (NACF) of an error signal;
    counting zero crossings (ZC) of samples of each of the frames;
    computing a low frequency signal to noise ratio by using the NACF and the low frequency band energy;
    computing a high frequency signal to noise ratio by using the NACF and the high frequency band energy;
    calculating a low frequency rate decision threshold (T0) by using the low frequency signal to noise ratio; and
    calculating a high frequency rate decision threshold (T1) by using the high frequency signal to noise ratio.

16. The method of claim 15, wherein each of the frames is classified as follows:
    if LFBE>T0 or HFBE>T1, then the frame is a speech frame, otherwise the frame is a non-speech frame;
    if the frame is a speech frame and NACF>0.5 and ZC<60, then the frame is a solid voiced speech frame, otherwise the frame is an unvoiced speech frame or a voiced speech frame;
    if the frame is an unvoiced speech frame or a voiced speech frame and
        NACF>0.5 and ZC<80
        Or
        NACF<0.25 and ZC<45
        Or
        Pg>15
        Or
        $5.190283*NACF - 0.092413*ZC + 3.091836 < 0$,
    then the frame is a voiced speech frame, otherwise the frame is an unvoiced speech frame.

17. An apparatus for wireless communications, comprising:
    means for receiving an input sound stream of a user;
    means for splitting the input sound stream into a plurality of frames;
    means for classifying each of the frames as one selected from the group consisting of a non-speech frame and a speech frame;
    means for determining a pitch of each of the frames in a subset of the speech frames;
    means for maintaining a table comprising a male score for each pitch and a female score for each pitch; the male scores being determined by computing a pitch of each of a number of male frames, counting a number of the frames with each particular pitch, and setting the male score for each pitch to a function of the number of the frames with the pitch divided by the number of male frames; the female scores being determined by computing a pitch of each of a number of female frames, counting a number of the frames with each particular pitch, and setting the female score for each pitch to a function of the number of the frames with the pitch divided by the number of female frames;
    means for maintaining a first sum including the male score for each determined pitch of each of the frames;
    means for maintaining a second sum including the female score for each determined pitch of each of the frames; and
    means for identifying a gender of the user as male when the first sum is greater than the second sum and identifying the gender as female when the second sum is greater than the first sum,
    wherein the means for determining the pitch comprises:
        means for filtering the speech frames to compute an error signal;
        means for computing an autocorrelation of the error signal;
        means for finding a maximum autocorrelation value; and
        means for setting the pitch to an index of the maximum autocorrelation value.

18. The apparatus of claim 17, wherein the means for determining the pitch further comprises means for filtering the error signal with a low pass filter and means for decimating the filtered error signal.

19. The apparatus of claim 17, wherein the subset of the speech frames comprises solid voiced speech frames.

20. The apparatus of claim 19, wherein the subset of the speech frames further comprises voiced speech frames.

21. The apparatus of claim 20, wherein the subset of the speech frames further comprises unvoiced speech frames.

22. The apparatus of claim 17, wherein the male score and the female score for each pitch are predetermined.

23. The apparatus of claim 17, wherein the means for classifying each of the frames comprises:
   means for computing a Linear Predictive Coding (LPC) predictor of the frame by determining an autocorrelation function of the frame and determining LPC coefficients;
   means for computing a prediction gain (Pg) using the autocorrelation function and the LPC predictor;
   means for computing a low frequency band energy (LFBE) and a high frequency band energy (HFBE) using the autocorrelation function;
   means for computing a normalized autocorrelation function (NACF) of an error signal;
   means for counting zero crossings (ZC) of samples of each of the frames;
   means for computing a low frequency signal to noise ratio by using the NACF and the low frequency band energy;
   means for computing a high frequency signal to noise ratio by using the NACF and the high frequency band energy;
   means for calculating a low frequency rate decision threshold (T0) by using the low frequency signal to noise ratio; and
   means for calculating a high frequency rate decision threshold (T1) by using the high frequency signal to noise ratio.

24. The apparatus of claim 23, wherein the means for classifying each of the frames classifies each of the frames as follows:
   if LFBE>T0 or HFBE>T1, then the frame is a speech frame, otherwise the frame is a non-speech frame;
   if the frame is a speech frame and NACF>0.5 and ZC<60, then the frame is a solid voiced speech frame, otherwise the frame is an unvoiced speech frame or a voiced speech frame;
   if the frame is an unvoiced speech frame or a voiced speech frame and
   NACF>0.5 and ZC<80
   Or
   NACF<0.25 and ZC<45
   Or
   Pg>15
   Or $5.190283*NACF-0.092413*ZC+3.091836<0$, then the frame is a voiced speech frame, otherwise the frame is an unvoiced speech frame.

25. A computer program product, comprising:
   a non-transitory computer-readable medium, comprising:
      code for receiving an input sound stream of a user;
      code for splitting the input sound stream into a plurality of frames;
      code for classifying each of the frames as one selected from the group consisting of a non-speech frame and a speech frame;
      code for determining a pitch of each of the frames in a subset of the speech frames;
      code for maintaining a table comprising a male score for each pitch and a female score for each pitch; the male scores being determined by computing a pitch of each of a number of male frames, counting a number of the frames with each particular pitch, and setting the male score for each pitch to a function of the number of the frames with the pitch divided by the number of male frames; the female scores being determined by computing a pitch of each of a number of female frames, counting a number of the frames with each particular pitch, and setting the female score for each pitch to a function of the number of the frames with the pitch divided by the number of female frames;
      code for maintaining a first sum including the male score for each determined pitch of each of the frames;
      code for maintaining a second sum including the female score for each determined pitch of each of the frames; and
      code for identifying a gender of the user as male when the first sum is greater than the second sum and identifying the gender as female when the second sum is greater than the first sum,
   wherein the code for determining the pitch comprises:
      code for filtering the speech frames to compute an error signal;
      code for computing an autocorrelation of the error signal;
      code for finding a maximum autocorrelation value; and
      code for setting the pitch to an index of the maximum autocorrelation value.

26. The computer program product of claim 25, wherein the code for determining the pitch further comprises code for filtering the error signal with a low pass filter and code for decimating the filtered error signal.

27. The computer program product of claim 25, wherein the subset of the speech frames comprises solid voiced speech frames.

28. The computer program product of claim 27, wherein the subset of the speech frames further comprises voiced speech frames.

29. The computer program product of claim 28, wherein the subset of the speech frames further comprises unvoiced speech frames.

30. The computer program product of claim 25, wherein the male score and the female score for each pitch are predetermined.

31. The computer program product of claim 25, wherein the code for classifying each of the frames comprises:
   code for computing a Linear Predictive Coding (LPC) predictor of the frame by determining an autocorrelation function of the frame and determining LPC coefficients;
   code for computing a prediction gain (Pg) using the autocorrelation function and the LPC predictor;
   code for computing a low frequency band energy (LFBE) and a high frequency band energy (HFBE) using the autocorrelation function;
   code for computing a normalized autocorrelation function (NACF) of an error signal;
   code for counting zero crossings (ZC) of samples of each of the frames;
   code for computing a low frequency signal to noise ratio by using the NACF and the low frequency band energy;
   code for computing a high frequency signal to noise ratio by using the NACF and the high frequency band energy;
   code for calculating a low frequency rate decision threshold (T0) by using the low frequency signal to noise ratio; and
   code for calculating a high frequency rate decision threshold (T1) by using the high frequency signal to noise ratio.

32. The computer program product of claim 31, wherein the code for classifying each of the frames classifies each of the frames as follows:

if LFBE>T0 or HFBE>T1, then the frame is a speech frame, otherwise the frame is a non-speech frame;
if the frame is a speech frame and NACF>0.5 and ZC<60, then the frame is a solid voiced speech frame, otherwise the frame is an unvoiced speech frame or a voiced speech frame;
if the frame is an unvoiced speech frame or a voiced speech frame and
NACF>0.5 and ZC<80
Or
NACF<0.25 and ZC<45
Or
Pg>15
Or
$$5.190283*NACF-0.092413*ZC+3.091836<0,$$
then the frame is a voiced speech frame, otherwise the frame is an unvoiced speech frame.

33. An apparatus for wireless communications, comprising:
a processing system configured to:
receive an input sound stream of a user;
split the input sound stream into a plurality of frames;
compute a Linear Predictive Coding (LPC) predictor of a frame by determining an autocorrelation function of the frame and determining LPC coefficients;
compute a prediction gain (Pg) using the autocorrelation function and the LPC predictor;
compute a low frequency band energy (LFBE) and a high frequency band energy (HFBE) using the autocorrelation function;
compute a normalized autocorrelation function (NACF) of an error signal;
count zero crossings (ZC) of samples of each of the frame;
compute a low frequency signal to noise ratio by using the NACF and the low frequency band energy;
compute a high frequency signal to noise ratio by using the NACF and the high frequency band energy;
calculate a low frequency rate decision threshold (T0) by using the low frequency signal to noise ratio;
calculate a high frequency rate decision threshold (T1) by using the high frequency signal to noise ratio;
classify each of the frames as one selected from the group consisting of a non-speech frame and a speech frame, wherein:
if LFBE>T0 or HFBE>T1, then the frame is a speech frame, otherwise the frame is a non-speech frame;
if the frame is a speech frame and NACF>0.5 and ZC<60, then the frame is a solid voiced speech frame, otherwise the frame is an unvoiced speech frame or a voiced speech frame;
if the frame is an unvoiced speech frame or a voiced speech frame and
NACF>0.5 and ZC<80
Or
NACF<0.25 and ZC<45
Or
Pg>15
Or
$$5.190283*NACF-0.092413*ZC+3.091836<0,$$
then the frame is a voiced speech frame, otherwise the frame is an unvoiced speech frame;
determine a pitch of each of the frames in a subset of the speech frames; and
identify a gender of the user from the determined pitch, wherein to determine the pitch, the processing system is configured to:
filter the speech frames to compute an error signal;
compute an autocorrelation of the error signal;
find a maximum autocorrelation value; and
set the pitch to an index of the maximum autocorrelation value.

34. A method for wireless communications, comprising:
receiving an input sound stream of a user;
splitting the input sound stream into a plurality of frames;
classifying each of the frames as one selected from the group consisting of a non-speech frame and a speech frame by:
computing a Linear Predictive Coding (LPC) predictor of the frame by determining an autocorrelation function of the frame and determining LPC coefficients;
computing a prediction gain (Pg) using the autocorrelation function and the LPC predictor;
computing a low frequency band energy (LFBE) and a high frequency band energy (HFBE) using the autocorrelation function;
computing a normalized autocorrelation function (NACF) of an error signal;
counting zero crossings (ZC) of samples of each of the frames;
computing a low frequency signal to noise ratio by using the NACF and the low frequency band energy;
computing a high frequency signal to noise ratio by using the NACF and the high frequency band energy;
calculating a low frequency rate decision threshold (T0) by using the low frequency signal to noise ratio; and
calculating a high frequency rate decision threshold (T1) by using the high frequency signal to noise ratio, wherein:
if LFBE>T0 or HFBE>T1, then the frame is a speech frame, otherwise the frame is a non-speech frame;
if the frame is a speech frame and NACF>0.5 and ZC<60, then the frame is a solid voiced speech frame, otherwise the frame is an unvoiced speech frame or a voiced speech frame;
if the frame is an unvoiced speech frame or a voiced speech frame and
NACF>0.5 and ZC<80
Or
NACF<0.25 and ZC<45
Or
Pg>15
Or
$$5.190283*NACF-0.092413*ZC+3.091836<0,$$
then the frame is a voiced speech frame, otherwise the frame is an unvoiced speech frame;
determining a pitch of each of the frames in a subset of the speech frames; and
identifying a gender of the user from the determined pitch, wherein determining the pitch comprises:
filtering the speech frames to compute an error signal;
computing an autocorrelation of the error signal;
finding a maximum autocorrelation value; and
setting the pitch to an index of the maximum autocorrelation value.

35. An apparatus for wireless communications, comprising:
means for receiving an input sound stream of a user;
means for splitting the input sound stream into a plurality of frames;

means for classifying each of the frames as one selected from the group consisting of a non-speech frame and a speech frame, the means for classifying each of the frames comprising:
  means for computing a Linear Predictive Coding (LPC) predictor of the frame by determining an autocorrelation function of the frame and determining LPC coefficients;
  means for computing a prediction gain (Pg) using the autocorrelation function and the LPC predictor;
  means for computing a low frequency band energy (LFBE) and a high frequency band energy (HFBE) using the autocorrelation function;
  means for computing a normalized autocorrelation function (NACF) of an error signal;
  means for counting zero crossings (ZC) of samples of each of the frames;
  means for computing a low frequency signal to noise ratio by using the NACF and the low frequency band energy;
  means for computing a high frequency signal to noise ratio by using the NACF and the high frequency band energy;
  means for calculating a low frequency rate decision threshold (T0) by using the low frequency signal to noise ratio; and
  means for calculating a high frequency rate decision threshold (T1) by using the high frequency signal to noise ratio, wherein:
    if LFBE>T0 or HFBE>T1, then the frame is a speech frame, otherwise the frame is a non-speech frame;
    if the frame is a speech frame and NACF>0.5 and ZC<60, then the frame is a solid voiced speech frame, otherwise the frame is an unvoiced speech frame or a voiced speech frame;
    if the frame is an unvoiced speech frame or a voiced speech frame and
      NACF>0.5 and ZC<80
        Or
      NACF<0.25 and ZC<45
        Or
      Pg>15
        Or
      $5.190283*NACF - 0.092413*ZC + 3.091836 < 0$,
    then the frame is a voiced speech frame, otherwise the frame is an unvoiced speech frame;
  means for determining a pitch of each of the frames in a subset of the speech frames; and
  means for identifying a gender of the user from the determined pitch,
  wherein the means for determining the pitch comprises:
    means for filtering the speech frames to compute an error signal;
    means for computing an autocorrelation of the error signal;
    means for finding a maximum autocorrelation value; and
    means for setting the pitch to an index of the maximum autocorrelation value.

36. A computer program product, comprising:
  a non-transitory computer-readable medium, comprising:
    code for receiving an input sound stream of a user;
    code for splitting the input sound stream into a plurality of frames;
    code for classifying each of the frames as one selected from the group consisting of a non-speech frame and a speech frame, the code for classifying each of the frames comprising:
      code for computing a Linear Predictive Coding (LPC) predictor of the frame by determining an autocorrelation function of the frame and determining LPC coefficients;
      code for computing a prediction gain (Pg) using the autocorrelation function and the LPC predictor;
      code for computing a low frequency band energy (LFBE) and a high frequency band energy (HFBE) using the autocorrelation function;
      code for computing a normalized autocorrelation function (NACF) of an error signal;
      code for counting zero crossings (ZC) of samples of each of the frames;
      code for computing a low frequency signal to noise ratio by using the NACF and the low frequency band energy;
      code for computing a high frequency signal to noise ratio by using the NACF and the high frequency band energy;
      code for calculating a low frequency rate decision threshold (T0) by using the low frequency signal to noise ratio; and
      code for calculating a high frequency rate decision threshold (T1) by using the high frequency signal to noise ratio, wherein:
        if LFBE>T0 or HFBE>T1, then the frame is a speech frame, otherwise the frame is a non-speech frame;
        if the frame is a speech frame and NACF>0.5 and ZC<60, then the frame is a solid voiced speech frame, otherwise the frame is an unvoiced speech frame or a voiced speech frame;
        if the frame is an unvoiced speech frame or a voiced speech frame and
          NACF>0.5 and ZC<80
            Or
          NACF<0.25 and ZC<45
            Or
          Pg>15
            Or
          $5.190283*NACF - 0.092413*ZC + 3.091836 < 0$,
        then the frame is a voiced speech frame, otherwise the frame is an unvoiced speech frame;
    code for determining a pitch of each of the frames in a subset of the speech frames; and
    code for identifying a gender of the user from the determined pitch,
    wherein the code for determining the pitch comprises:
      code for filtering the speech frames to compute an error signal;
      code for computing an autocorrelation of the error signal;
      code for finding a maximum autocorrelation value; and
code for setting the pitch to an index of the maximum autocorrelation value.

* * * * *